(12) United States Patent
Mansour et al.

(10) Patent No.: US 8,098,748 B1
(45) Date of Patent: Jan. 17, 2012

(54) SYSTEMS AND METHODS OF TESTING WIRELESS NETWORKS

(75) Inventors: Nagi A. Mansour, Arlington, VA (US); Rajesh Gangadhar, Ashburn, VA (US)

(73) Assignee: Clearwire IP Holdings, LLC, Kirkland, WA (US)

( * ) Notice: Subject to any disclaimer, the term of this patent is extended or adjusted under 35 U.S.C. 154(b) by 1087 days.

(21) Appl. No.: 11/939,136

(22) Filed: Nov. 13, 2007

(51) Int. Cl.
*H04K 1/10* (2006.01)
(52) U.S. Cl. ........................ 375/260; 370/252; 455/453
(58) Field of Classification Search .................. 370/252, 370/338, 352; 375/144, 316, 350; 455/67.11, 455/450, 453
See application file for complete search history.

(56) References Cited

U.S. PATENT DOCUMENTS

| | | | |
|---|---|---|---|
| 6,154,638 A | 11/2000 | Cheng et al. | |
| 7,260,079 B1 * | 8/2007 | Chapman et al. | 370/338 |
| 7,298,773 B2 * | 11/2007 | Yun et al. | 375/144 |
| 7,558,352 B2 * | 7/2009 | Bilgic et al. | 375/350 |
| 2004/0203418 A1 | 10/2004 | Ang et al. | |
| 2006/0209803 A1 * | 9/2006 | Rajaniemi et al. | 370/352 |
| 2006/0211427 A1 | 9/2006 | Azman et al. | |
| 2009/0274059 A1 * | 11/2009 | Xing et al. | 370/252 |
| 2010/0130223 A1 * | 5/2010 | Liao et al. | 455/453 |

* cited by examiner

*Primary Examiner* — David C. Payne
*Assistant Examiner* — Leon-Viet Nguyen
(74) *Attorney, Agent, or Firm* — Crowell & Moring LLP

(57) ABSTRACT

Systems and methods of testing a wireless network are provided. Simulated user data, spread across all user data sub-carriers of all sub-channels of a frequency band assigned for transmissions, is transmitted by a number of base stations surrounding a base station under test. The power level of the simulated user data is determined based on a selected network load. A mobile station receives signals from the base station under test and the number of base stations, and the interference caused by the simulated user data to the transmission from the base station under test is determined. When less than 100% loading is employed for testing, the sub-channels carrying the simulated user data can vary on a frame-by-frame basis.

18 Claims, 6 Drawing Sheets

US 8,098,748 B1

SYSTEMS AND METHODS OF TESTING WIRELESS NETWORKS

BACKGROUND OF THE INVENTION

Wireless communication networks are very complicated, and expensive to deploy. Prior to deploying a wireless communication network, extensive computer simulations are performed in order to optimize the parameters and placement of networks elements. Computer simulations cannot, however, account for the real-world conditions in which the network is deployed. Accordingly, once a wireless communication network is installed, additional testing is performed in order to account for real-world conditions. Furthermore, as wireless communication networks are expanded with additional base stations to provide additional capacity, the network must again be tested to optimize the base stations.

SUMMARY OF THE INVENTION

Various techniques have been developed for testing installed networks in order to verify the performance of the technology and to optimize base station parameters. It has been recognized that in wireless communication networks employing orthogonal frequency division multiplexing (OFDM), accurate testing can be produced for a center cell under test by loading surrounding base stations with simulated user data across all user data sub-carriers of all sub-channels within an allocated frequency band. The results of the testing can then be used to optimize the wireless system under test by adjusting base station parameters of the base station in the center cell and/or surrounding base stations. Furthermore, when less than 100% loading is employed, the sub-channels in which the simulated user data is carried can change on a frame-by-frame basis.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
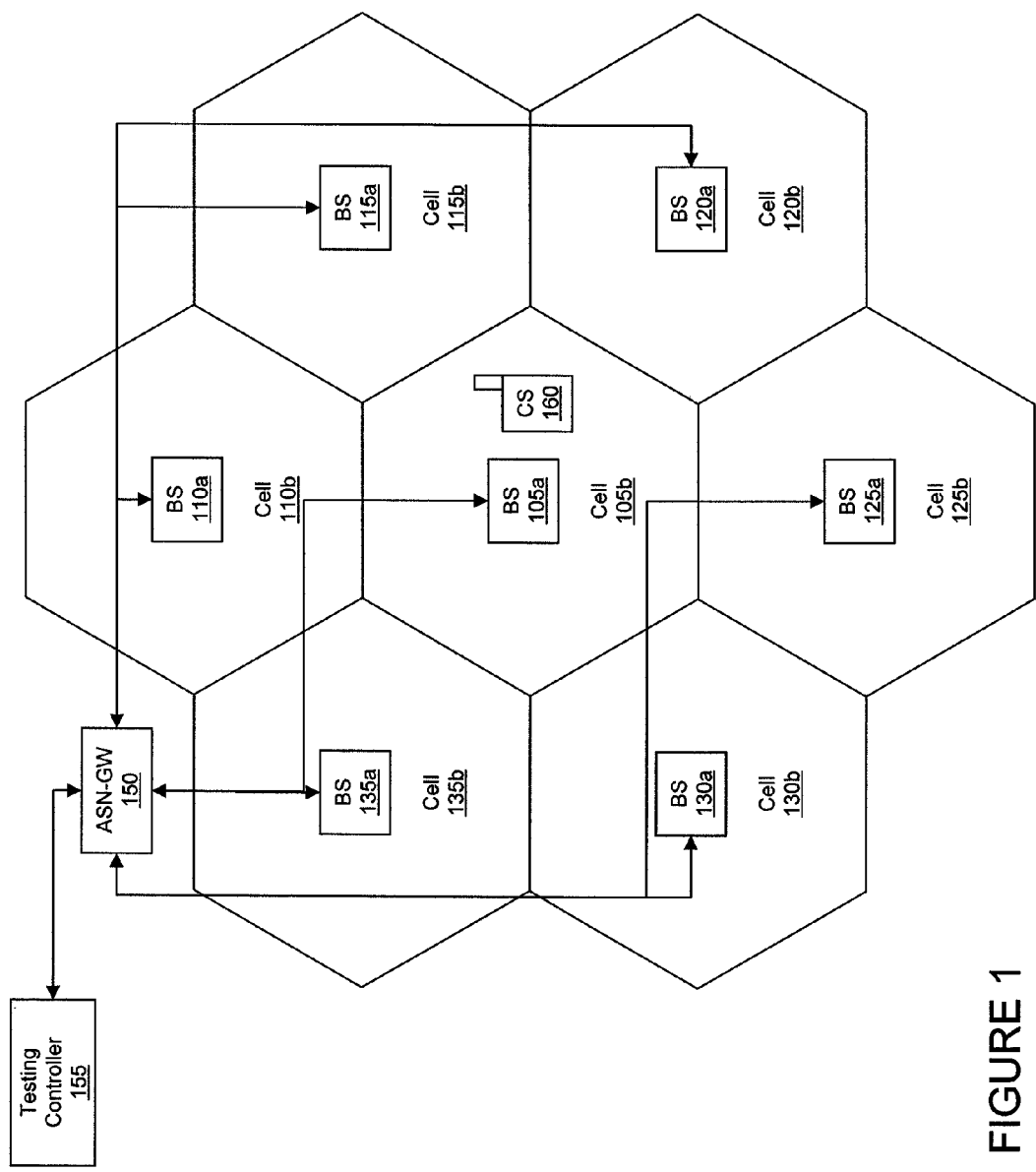
FIG. 1 is a block diagram illustrating an exemplary wireless communication system in accordance with the present invention.

FIG. 1 is a block diagram illustrating an exemplary wireless communication system in accordance with the present invention. The wireless communication system includes a base station 105a being tested, located in center cell 105b, and a number of surrounding base stations 110a-135a, respectively located in cells 110b-135b. Base stations 105a-135a are coupled to access service network gateway (ASN-GW) 150, which in turn is coupled to testing controller 155. The system also includes at least one communication station 160 located within center cell 105b. As will be described in more detail below, exemplary embodiments determine the effect of loading that results from interference caused by transmissions from surrounding base stations 110a-135a to communication station (CS) 160 and other communication stations that are located in the center cell 105b that receive transmissions from base station 105a. This interference is in the form of simulated user data.

Figure 2A:
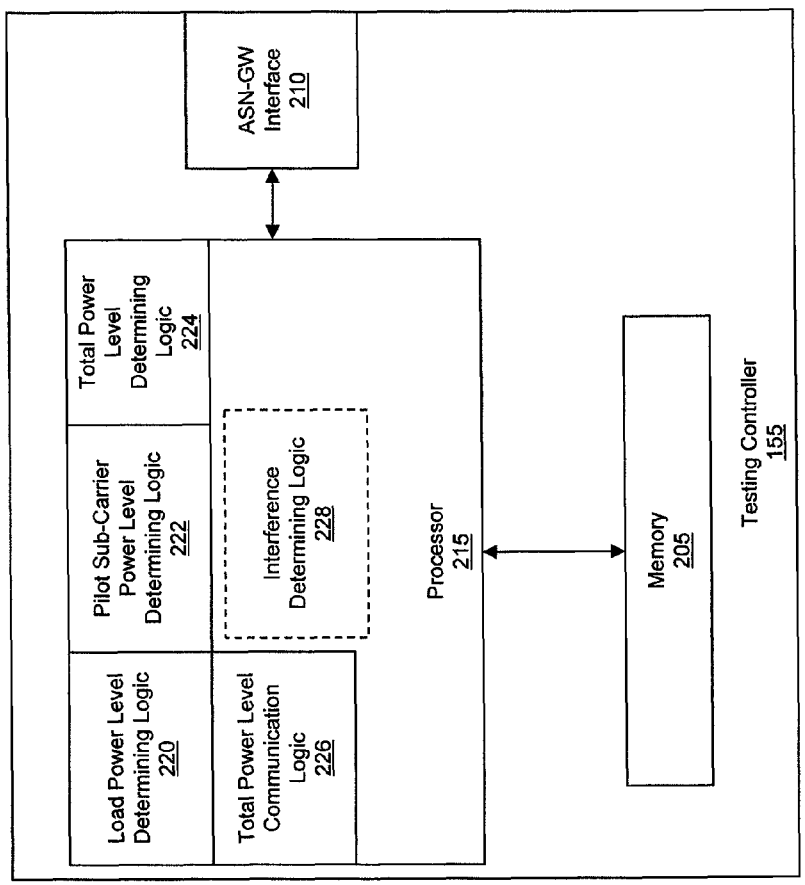
FIG. 2A is a block diagram of an exemplary testing controller in accordance with the present invention.

FIG. 2A is a block diagram of an exemplary testing controller in accordance with the present invention. Testing controller 155 includes memory 205 and ASN-GW interface 210 coupled to processor 215. Processor 215 includes logic 220-228, which will be described in more detail below in connection with FIG. 3. Processor 215 can be any type of processor, such as a microprocessor, field programmable gate array (FPGA) and/or an application specific integrated circuit (ASIC). When processor 215 is a microprocessor then logic 220-228 can be processor-executable code loaded from memory 205.

Figure 2B:
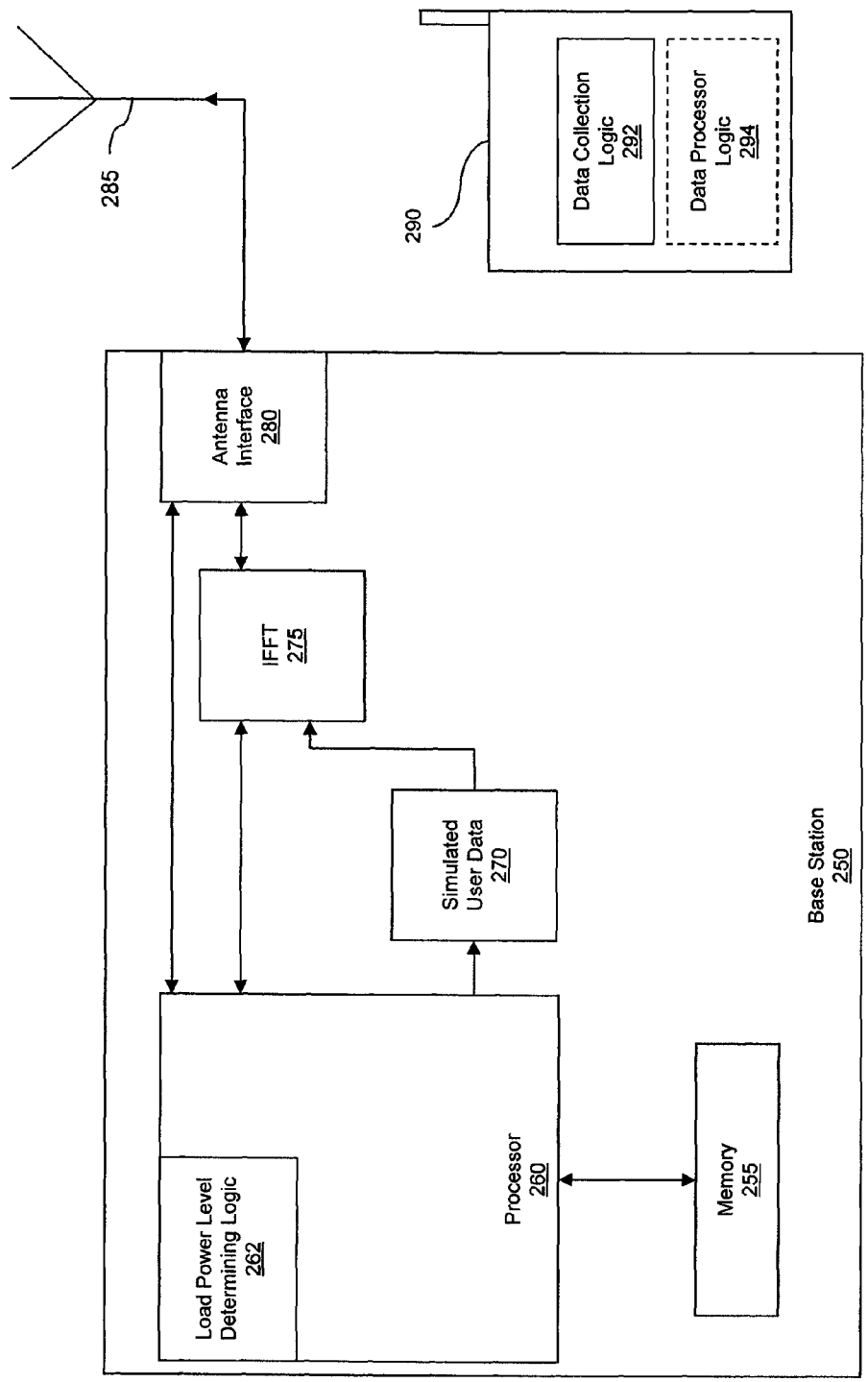
FIG. 2B is a block diagram of an exemplary base station and communication station in accordance with the present invention.

FIG. 2B is a block diagram of an exemplary base station and communication station in accordance with the present invention. Base station 250 includes a processor 260 coupled to antenna interface 280, simulated user data source 270, Inverse Fast Fourier Transform (IFFT) processor 275 and memory 255. Processor 260 includes logic 262, which will be described in more detail below in connection with FIGS. 3A and 3B. Processor 260 can be any type of processor, such as a microprocessor, field programmable gate array (FPGA) and/or an application specific integrated circuit (ASIC). When processor 260 is a microprocessor then logic 262 can be processor-executable code loaded from memory 255. Antenna interface 280 is coupled to antenna 285. The simulated user data generated by element 270 is fed into IFFT processor 275, which, in several processing stages, spreads the simulated user data across user data sub-carriers of sub-channels, and the resultant signals are transmitted by antenna interface 280.

The communication station 290 includes data collection logic 292 and data processor logic 294. This logic can be part of a microprocessor, field programmable gate array (FPGA) and/or an application specific integrated circuit (ASIC). Data processor logic 294 reports performance data such as user/sector throughput, carrier-to-interference noise ratio (CINR), modulation and coding scheme (MCS), and/or the like. Specifically, communication station 290 reports signal measurements, interference levels, CINR, MCS value and/or the like to the base station in the center cell, and the base station forwards the signal measurements to testing controller 155 for determination of the interference.

The methods of FIGS. 3A and 3B will be described in connection with a network operating in accordance with the WiMAX standard using a time division duplex operation. FIG. 4 is a block diagram of an exemplary WiMAX time division duplex (TDD) frame. The frame structure begins with a preamble that is used for physical layer procedures, such as time and frequency synchronization and initial channel estimation. The downlink (DL) preamble is followed by a frame control header (FCH) that provides frame configuration information, such as MAP message length and the usable sub-carriers. Multiple users are allocated data regions within the frame, and these allocations are specified in the uplink and downlink messages (DL-MAP and UL-MAP). In the TDD operation using a 10 MHz channel, the frame has an allocation in time of 48 symbols and an allocation in frequency using 1024 sub-carriers. For the downlink/uplink ratio of 3:2 there will be 22:15 data symbols with the rest of the frame used for preamble and control channels. Symbols and sub-carriers are resources that can be assigned to users.

Figure 3A:
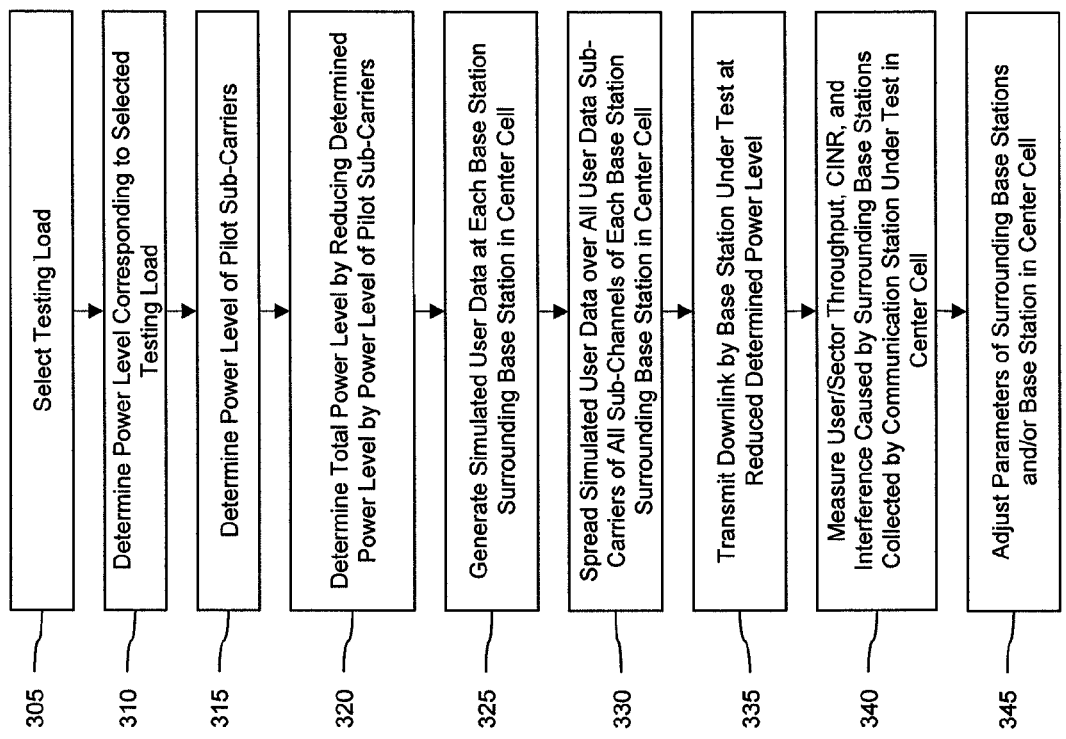
FIGS. 3A and 3B are flowcharts of exemplary methods of testing downlink communications in accordance with the present invention.
Figure 3B:
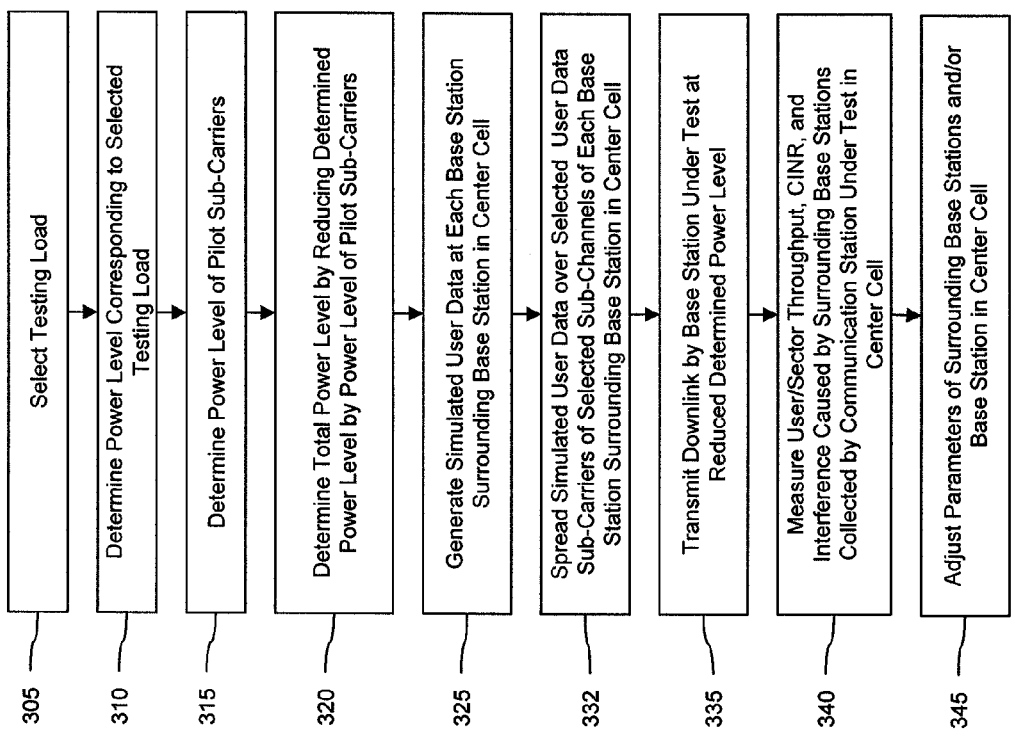
Figure 4:
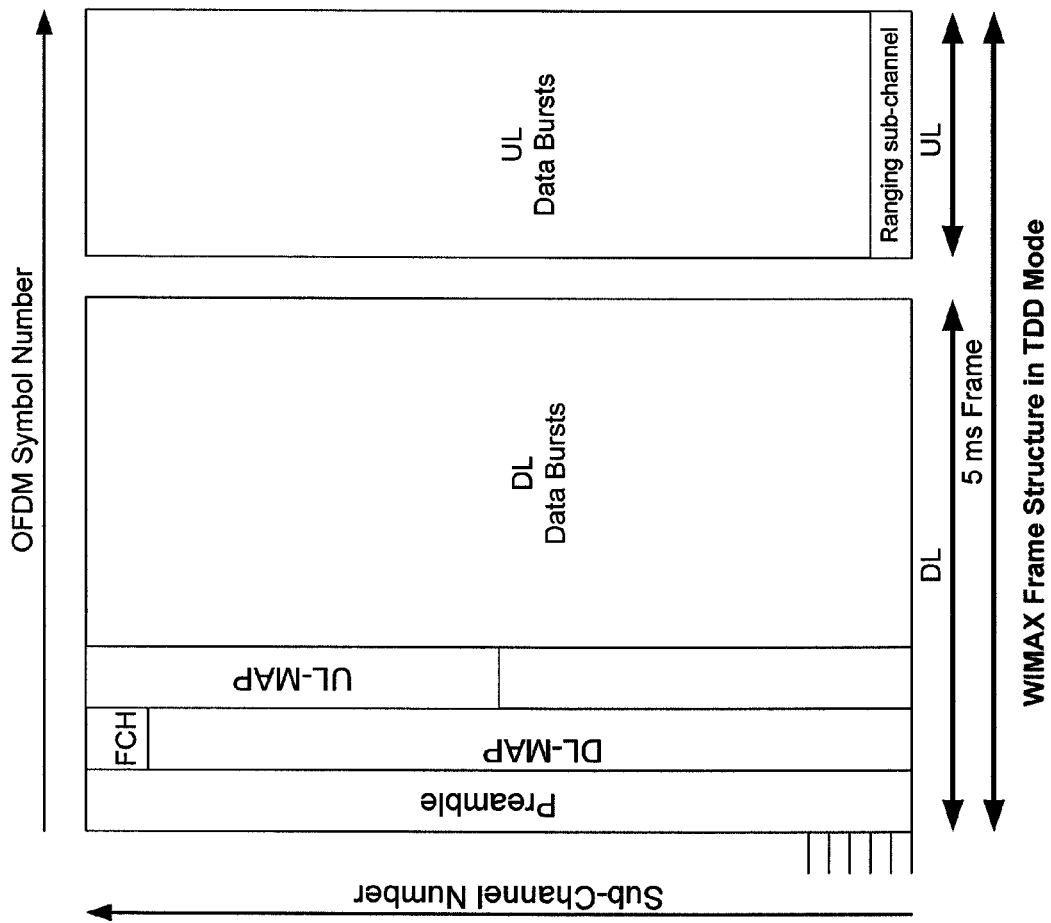
FIG. 4 is a block diagram of an exemplary WiMAX time division duplex (TDD) frame.

FIGS. 3A and 3B are flowcharts of exemplary methods of testing downlink communications in accordance with the present invention. When a testing load is selected (step 305), logic 220 determines a power level corresponding to the selected testing load (step 310). Logic 222 then determines a power level of the pilot sub-carriers (step 315). Logic 224 determines the total power level by reducing the determined power level corresponding to the selected testing load by the power level of the pilot sub-carriers (step 320). Specifically, the simulated user data power is determined based on the following formula:

Simulated user data=(Fractional Loading)×[(Base Station Power)−(Pilot Sub-Carrier Power)].

It will be recognized that a 50% fractional loading is equal to half of the base station power. Logic 226 communicates the total power level to base stations 110a-135a by way of ASN-GW 150.

Simulated user data is generated at each base station that surrounds the base station under test (step 325), and the base stations spread the simulated user data over all user data sub-carriers of all sub-channels (step 330). For example, in a WiMAX system that use a 10 MHz channel in the downlink, of the 1024 sub-carriers, 840 sub-carriers are used to carry user data and pilots. The 840 sub-carriers constitute 30 sub-channels, and each sub-channel has 24 user data sub-carriers and 4 pilot sub-carriers. Accordingly, the simulated user data is spread across the 720 user data sub-carriers (i.e., (24 user data sub-carriers/sub-channel)*30 sub-channels). Each of the base stations then transmits the simulated user data at the reduced determined power level (step 335).

Data collection logic 292 of communication station 290 collects performance data such as user/sector throughput, CINR, MCS, and/or the like, and data processor logic 294 processes the performance data, and forwards this data to logic 228 of testing controller 155, which determines the interference caused by transmissions from surrounding cells by their corresponding base stations to the communication station under test located in the center cell that receives trans-mission from the base station under test (step 340). Specifi-cally, a communication station located in the center cell mea-sures signals transmitted by the various base stations. When performance data is collected by data processor logic 294 of the communication station, the communication station then sends the results of the determination to testing controller 155 by way of base station 105a. The effect of the loading signals in the surrounding cells can be determined by measuring the user and sector throughput in the center cell. Based on the determined interference, parameters of the surrounding base stations and/or the base station under test can be adjusted (step 345).

In the method of FIG. 3A the amount of simulated user data was determined based on the product of the fractional loading and the base station power. As an alternative, the simulated user data power can be determined using the following for-mula:

Simulated User Data Power=(Number of Sub-Chan-nels N)×(Loading Factor)

where N is the number of user data sub-channels. It will be recognized that a 50% loading is related to N/2. The relation-ship between the number of sub-channels and the loading percentage is set forth in the following table.

| # Sub-Channels | Percent Loading |
|---|---|
| 9 | 30 |
| 15 | 50 |
| 18 | 60 |
| 24 | 80 |
| 30 | 100 |

In the methods described above when less than 100% load-ing is employed, the particular sub-channels in which the simulated user data is transmitted can be fixed for a predeter-mined period of time, or can change on a frame-by-frame basis. In this later case, for example when there is 50% load-ing, odd sub-channels can include simulated user data for a first set of frames and even sub-channels can include the simulated user data for other frames. The frames for the even and odd sub-channels can be inter-leaved, such that a frame with simulated user data for even sub-channels can be fol-lowed by a frame with simulated user data for odd sub-channels. It should be recognized that the present invention is not limited to grouping even and odd sub-channels for differ-ent frames, and that other sub-channel assignments can be employed. Accordingly, in this case, as illustrated in FIG. 3B, the simulated user data is spread across selected sub-channels (step 332) instead of across all sub-channels (step 330).

It should be recognized that when less than 100% loading is employed, the method of FIG. 3A can still be employed, and in this case the simulated user data will be spread across all sub-carriers, but will be transmitted at a lower power level than when 100% loading is employed.

The foregoing disclosure has been set forth merely to illus-trate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of testing a wireless network, the method comprising the act of:
transmitting simulated user data from a number of base stations, located in proximity to a first base station, at a predetermined power level, wherein the number of base stations and the first base station transmit using orthogo-nal frequency division multiplexing (OFDM) and the simulated user data is spread across all user data sub-carriers of all sub-channels of a frequency band assigned for OFDM transmissions;
transmitting, by the first base station, communications over a number of sub-channels of the frequency band assigned for OFDM transmission; and
determining interference caused by the transmissions from the number of base stations to transmissions from the first base station,
wherein the predetermined power level is determined by subtracting a power level of pilot sub-carriers from a total power level to produce a difference and multiplying the difference by fractional loading.

2. The method of claim 1, further comprising the act of:
adjusting a parameter of at least one of the number of base stations based on the determined interference.

3. The method of claim 2, wherein the adjustment is an adjustment of an antenna of the at least one of the number of base stations.

4. The method of claim 2, wherein the adjustment is a power level of transmission by the at least one of the number of base stations.

5. The method of claim 1, further comprising the act of:
adjusting the first base station based on the determined interference.

6. The method of claim 1, further comprising the acts of:
inserting simulated user data into an inverse fast Fourier transform processor of the first base station, wherein the fast Fourier transform processor spreads the simulated user data across all user data sub-carriers of all sub-channels.

7. The method of claim 1, wherein a communication station receives transmissions from the number of base stations and the first base station, and the interference is determined based on the transmissions received by the mobile station.

8. A wireless communication system, comprising:
a access service network gateway;
a base station coupled to the access service network gateway; and
a testing controller, coupled to the access service network gateway, comprising
a memory;
an interface coupling the testing controller to the access service network gateway; and
a processor coupled to the memory and interface, wherein the processor includes
logic that determines a total power level for transmission by base stations proximately located to the base station; and
logic that determines interference caused by the proximately located base stations, transmitting simulated user data, to the base station,
wherein the simulated user data is spread across all sub-channels of a frequency band assigned for orthogonal frequency division multiplexing (OFDM) transmissions.

9. A wireless communication system, comprising:
a access service network gateway;
a base station coupled to the access service network gateway; and
a testing controller, coupled to the access service network gateway, comprising
a memory;
an interface coupling the testing controller to the access service network gateway; and
a processor coupled to the memory and interface, wherein the processor includes
logic that determines a total power level for transmission by base stations proximately located to the base station; and
logic that determines interference caused by the proximately located base stations, transmitting simulated user data, to the base station,
logic that determines a power level based upon a selected load;
logic that determines a power level of pilot sub-carriers,
wherein the total power level is determined by subtracting the power level of the pilot sub-carriers from a base station power level and multiplying the difference by fractional loading, and
wherein the simulated user data is spread across all sub-channels of a frequency band assigned for orthogonal frequency division multiplexing (OFDM) transmissions.

10. The wireless communication system of claim 8, wherein the system also comprises a communication station.

11. The wireless communication system of claim 10, wherein the base station comprises:
an antenna interface that transmits communications to the communication station;
a processor that produces communications for transmission to a communication station over a number of sub-channels;
an simulated user data source that generates simulated user data; and
an inverse fast Fourier transform processor that spreads the generated simulated user data across all user data sub-carriers of all sub-channels of a frequency band assigned.

12. A method of testing a wireless network, the method comprising the act of:
transmitting simulated user data from a number of base stations, located in proximity to a first base station, at a predetermined power level, wherein the number of base stations and the first base station transmit using orthogonal frequency division multiplexing (OFDM) and the simulated user data is spread across user data sub-carriers of a first set of sub-channels of a frequency band assigned for OFDM transmissions for a first frame and across user data sub-carriers of a second set of sub-channels for a second frame;
transmitting, by the first base station, communications over a number of sub-channels of the frequency band assigned for OFDM transmission; and
determining interference caused by the transmissions from the number of base stations to transmissions from the first base station,
wherein the predetermined power level for the number of base stations transmitting simulated user data is set based on a selected load.

13. The method of claim 12, wherein the interference is determined over a number of frames, and the first and second set of sub-channels are alternately employed for each frame in a period of time.

14. The method of claim 13, wherein when a 50% loading is employed for testing, odd sub-channels are assigned for the first frame and even sub-channels are assigned for the second frame.

15. The method of claim 12, further comprising the act of:
adjusting at least one of the number of base stations based on the determined interference.

16. The method of claim 15, wherein the adjustment is an adjustment of an antenna of the at least one of the number of base stations.

17. The method of claim 15, wherein the adjustment is a power level of transmission by the at least one of the number of base stations.

18. The method of claim 12, further comprising the act of:
adjusting the first base station based on the determined interference.

* * * * *